United States Patent [19]

Toull

[11] 4,038,009
[45] July 26, 1977

[54] APPARATUS FOR THE MANUFACTURE OF DISC RECORDS

[75] Inventor: William Herbert Toull, West Drayton, England

[73] Assignee: E M I Limited, Hayes, England

[21] Appl. No.: 613,873

[22] Filed: Sept. 16, 1975

[30] Foreign Application Priority Data

Oct. 3, 1974  United Kingdom .............. 42897/74

[51] Int. Cl.² ............................................. B29D 17/00
[52] U.S. Cl. .................................... 425/308; 425/112; 425/116; 425/810
[58] Field of Search ............... 425/810, 112, 123, 135, 425/116, 109, 509, 810

[56] References Cited

U.S. PATENT DOCUMENTS

| | | | |
|---|---|---|---|
| 2,743,478 | 5/1956 | Harlow et al. | 425/509 |
| 3,186,029 | 6/1965 | Joseph | 425/123 |
| 3,329,997 | 7/1967 | Rand et al. | 425/112 |
| 3,514,813 | 6/1970 | Westermann | 429/810 |
| 3,526,690 | 9/1970 | Bachman | 425/135 X |
| 3,662,051 | 5/1972 | Harlow et al. | 425/109 X |
| 3,663,136 | 5/1972 | Westermann | 425/810 |
| 3,702,749 | 11/1972 | Flusfeder et al. | 425/810 |
| 3,833,328 | 9/1974 | Palmer et al. | 425/116 X |

FOREIGN PATENT DOCUMENTS 1,269,170  4/1972  United Kingdom

Primary Examiner—J. Howard Flint, Jr.
Attorney, Agent, or Firm—Fleit & Jacobson

[57] ABSTRACT

In the production of disc records the disc is formed with flash attached around it. A method of trimming the flash from the disc is to place the disc with flash attached on a support no larger than the disc and cut the flash around the edge of the disc to separate a ring of flash. The trimmed disc is held up and the flash falls to be swept away beneath it. The flash is preferably cut through at a web round the disc with a heated knife blade. Apparatus including a turntable and central record clamp is described and the integration of trimming apparatus into an automatic record press to use the transfer sled is also described.

10 Claims, 8 Drawing Figures

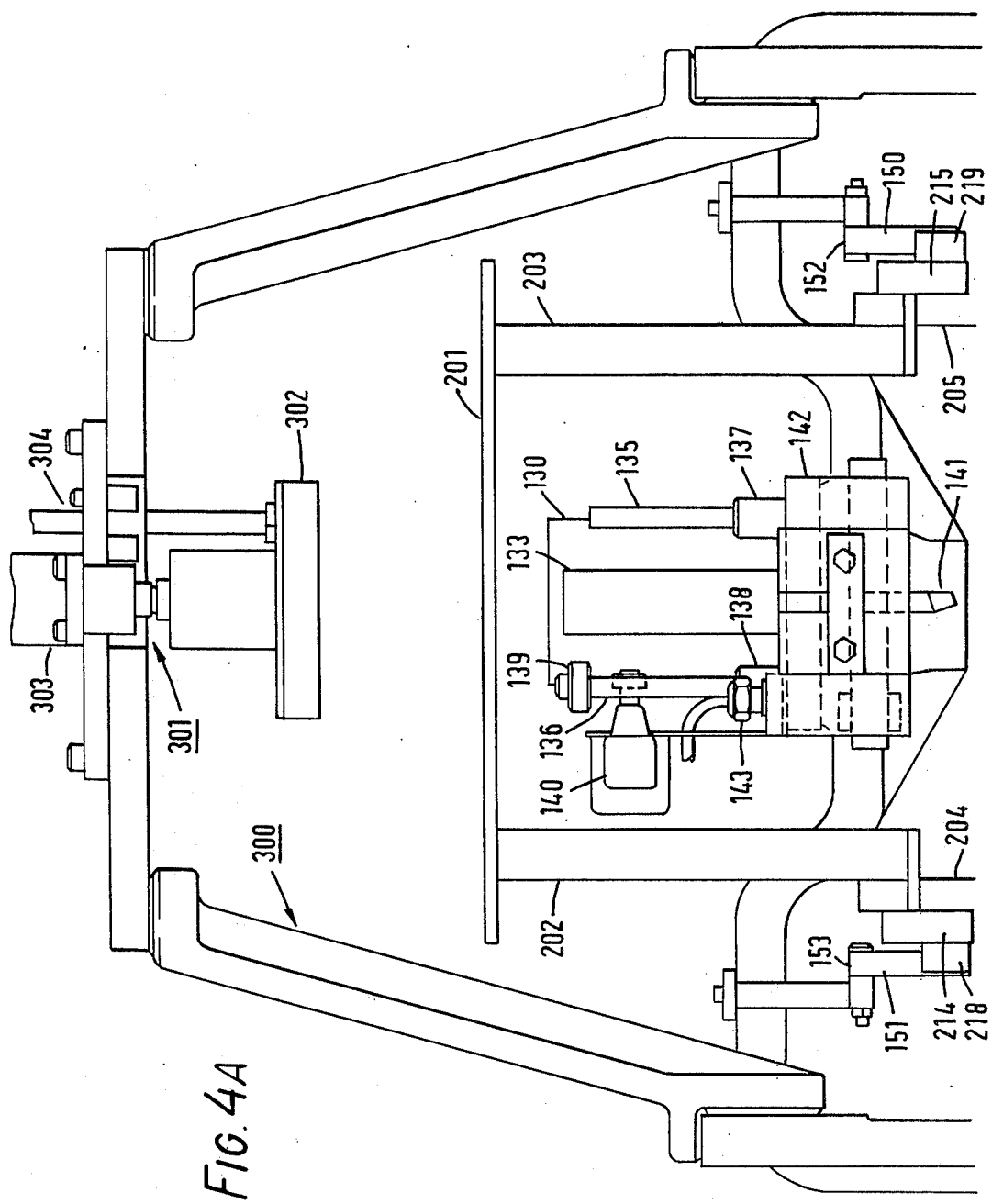

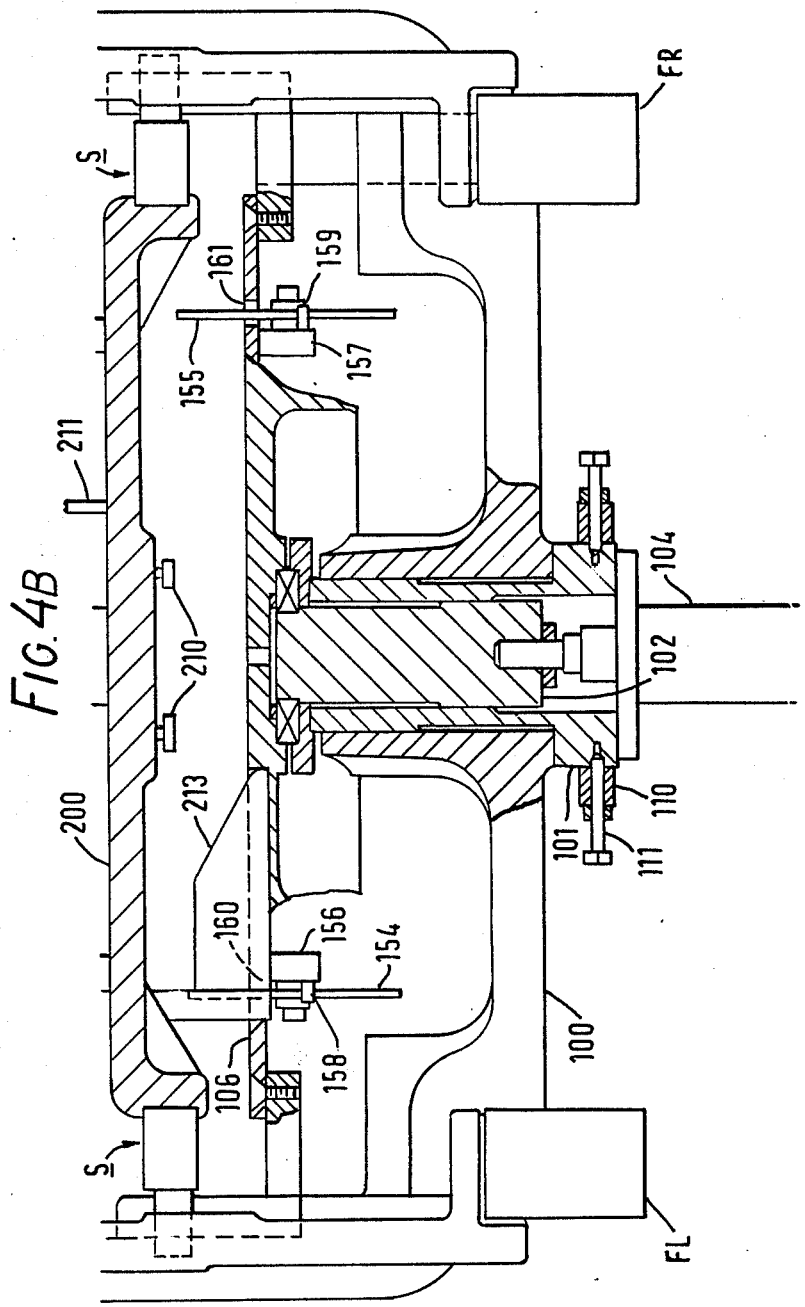

APPARATUS FOR THE MANUFACTURE OF DISC RECORDS

This invention relates to apparatus for the manufacture of disc records such as have on a surface gramophone (sound) or video recordings.

Disc records, when prepared by moulding, stamping or other means, have surplus material attached as "flash". Such flash is usually essential to ensure that sufficient material is available for the preparation of the record but must be removed to leave a neat record edge without distorting the record.

It is an object of the invention to provide an improved apparatus for the manufacture of disc records.

It is among the more specific objects of the invention to provide in such apparatus an arrangement for the removal of flash trimmed from a record and an arrangement for trimming flash from a record, especially in such apparatus for the automatic production of disc records.

According to the invention there is provided in apparatus for the manufacture of a disc record apparatus the trimming of flash from a disc record including means to transfer the disc with flash attached and release it to a support no larger than the disc when trimmed, means to hold the disc with flash on said support, means to provide relative motion of the disc with flash and a trimming member thereby to cut the flash at the edge of the supported disc to separate a ring of flash from the disc, and means to transfer the trimmed disc off the support and away from the trimmed flash to a receiving point.

The disc may be clamped at the centre between a turntable support and a freely rotatable collar against which the turntable is urged. There may be a pilot pin to centralise the disc on the turntable.

The flash may be cut through at a web at the finished disc edge by a downstroke of the trimming member, which may be a heated knife blade having a raked leading edge. The turntable may be revolved to move the disc to cut free the flash. The turntable may be revolved by an electric motor via a telescopic rim drive means. The motor may be controlled to start in response to the stroke of the extruder ram.

The transfer means may be a transfer sled of an automatic disc record press. There may be a suction element on the transfer means which the disc contacts when the turntable support is urged further on the retraction of the collar to transfer the disc from the support. There may be an element operable with the transfer means to sweep the flash away which passed clear of a disc on the support on a return stroke of the sled and sweeps a platform and the turntable, which is extendable therefrom, on the forward stroke.

According to the invention the apparatus for making a disc record includes a source of material mouldable for processing to a disc to supply said material to a first work station at which to form a shot of said material, a second work station at which to press from said shot a disc with surplus material attached as flash, a third work station a which to trim said flash material from said disc, a receiver for trimmed discs and a reciprocal transfer assembly having first, second and third transfer elements simultaneously operable forwardly to pick-up material in process from a respective work station and transfer it to a set-down position and return empty to the pick-up work station, the transfer assembly also having a flash clearing element simultaneously operable with said transfer elements to sweep trimmed flash from the third work station to a discharge point.

Embodiments of the invention will now be described with reference to the accompanying drawings in which.

Figure 1A:
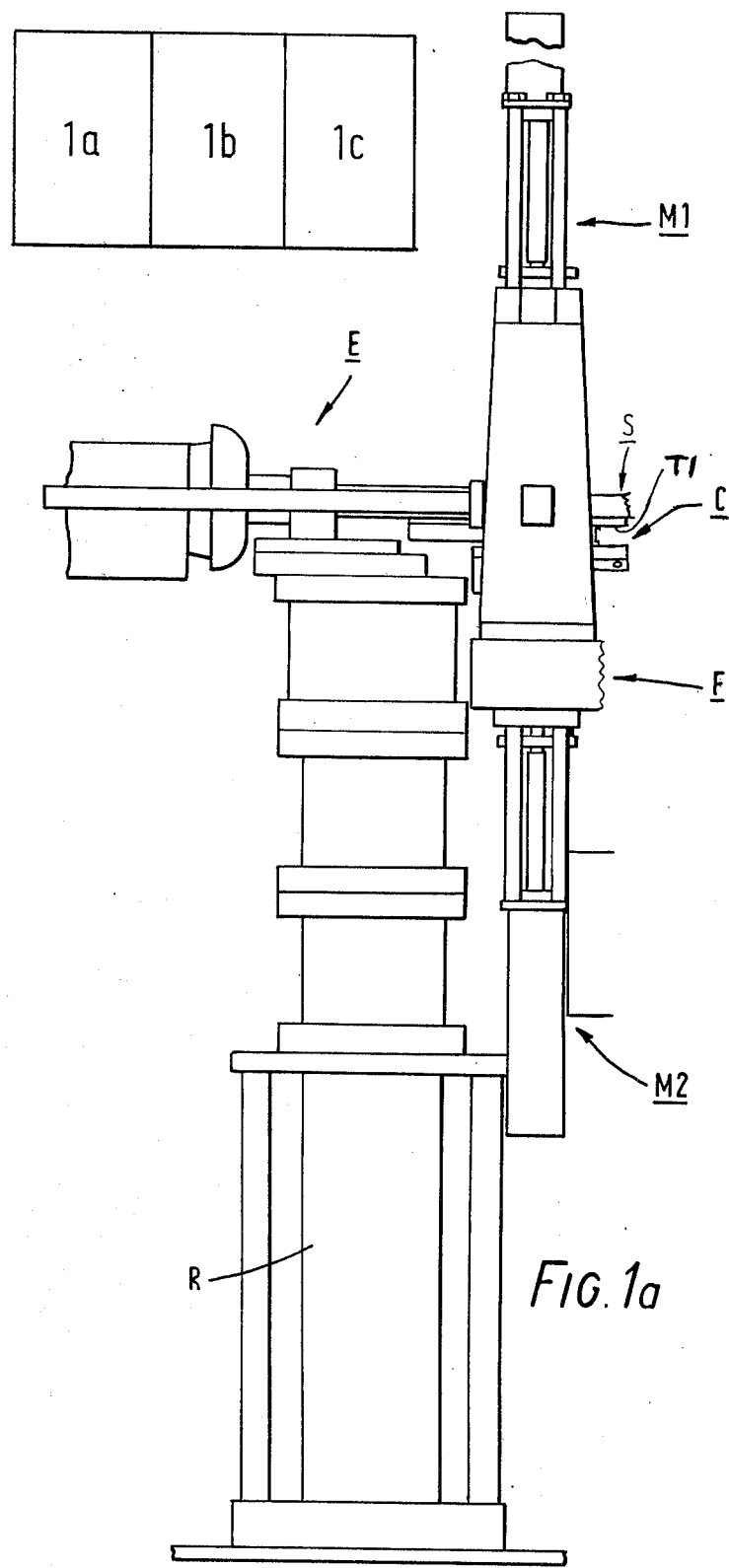
FIG. 1a is a left side elevation of an automatic disc record press.
Figure 1B:
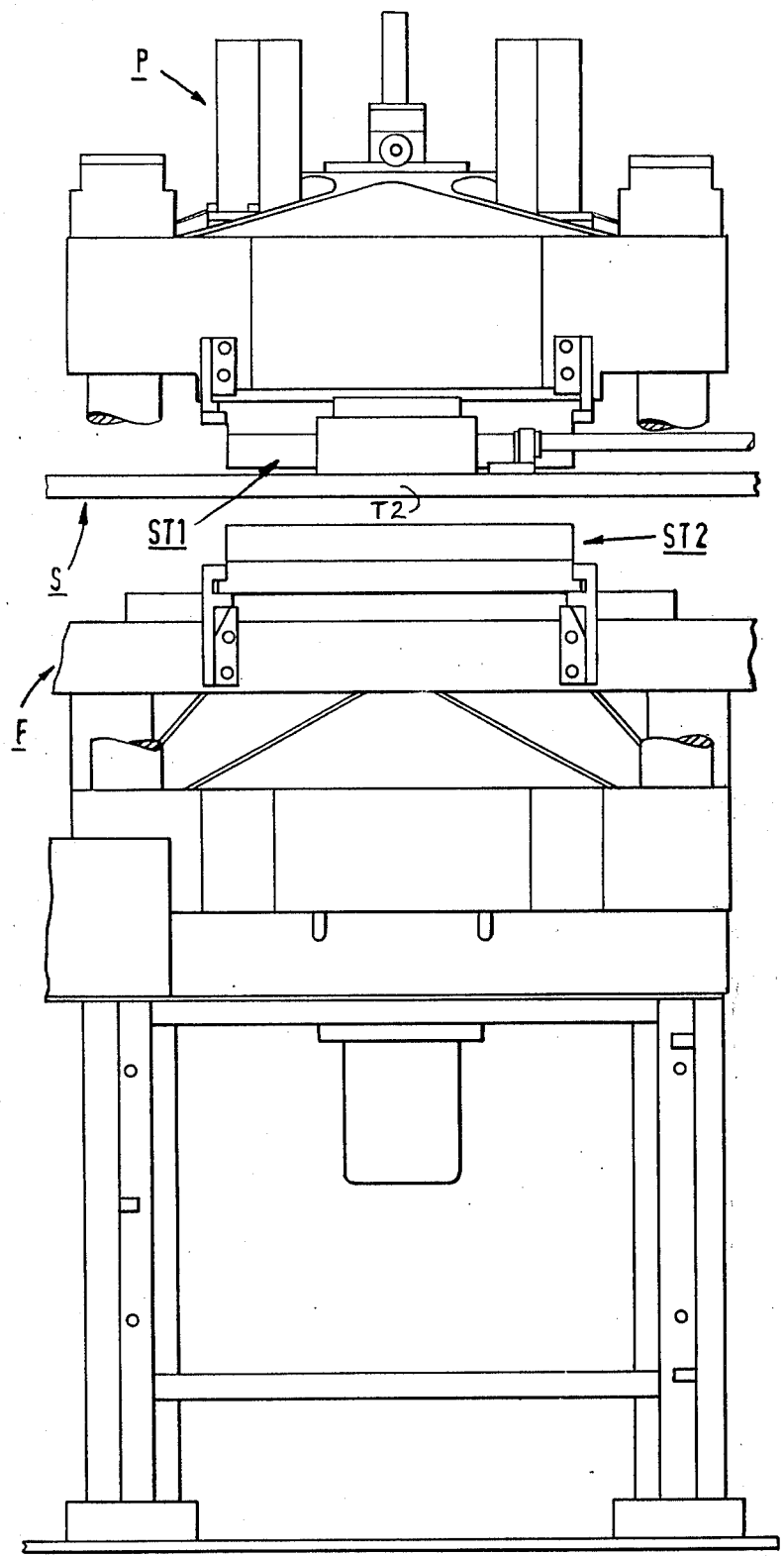
FIG. 1b is a middle side elevation of an automatic disc record press.
Figure 1C:
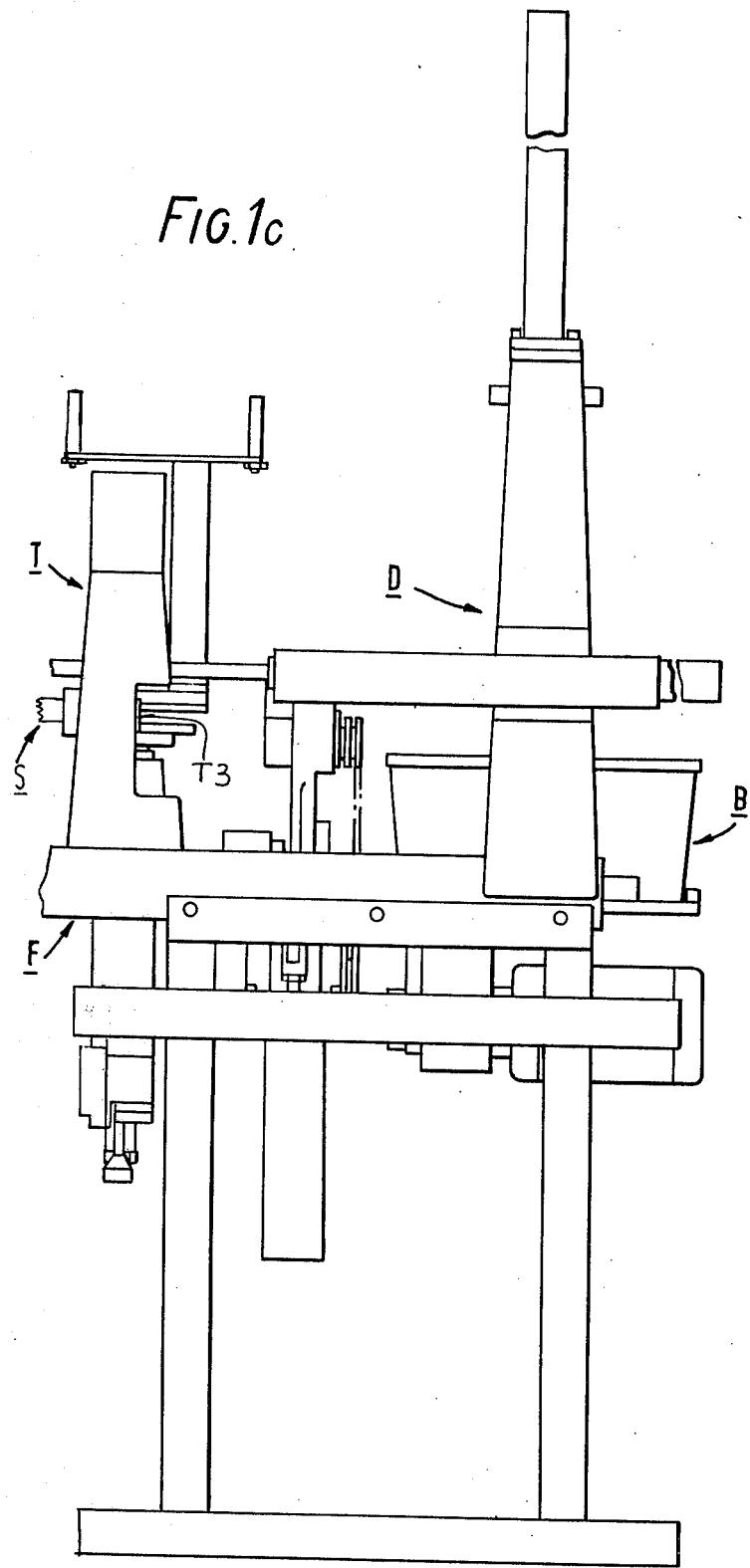
FIG. 1c is a right side elevation of an automatic disc record press.
Figure 2:
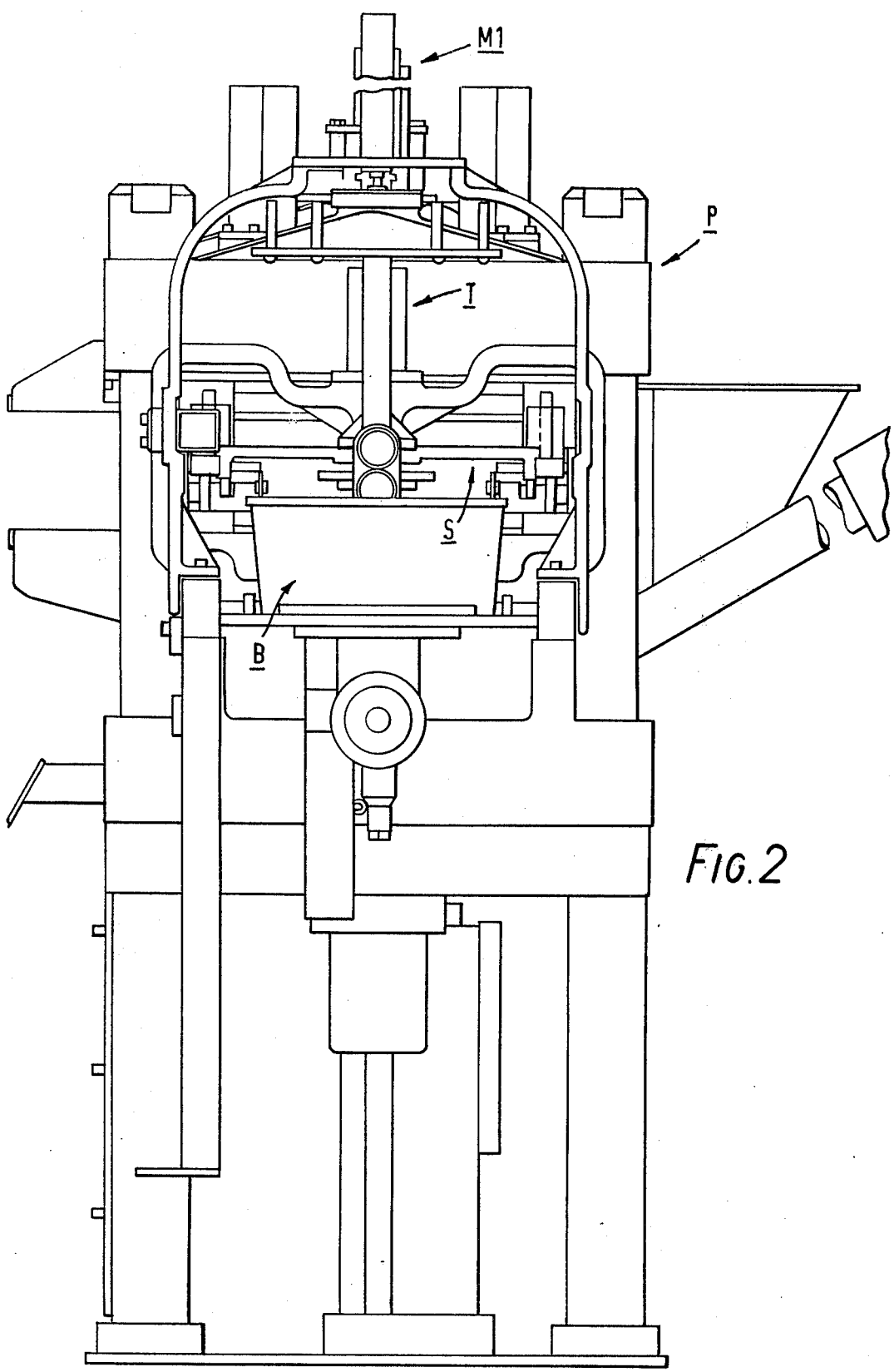
FIG. 2 is an end elevation of the press of FIG. 1.
Figure 3A:
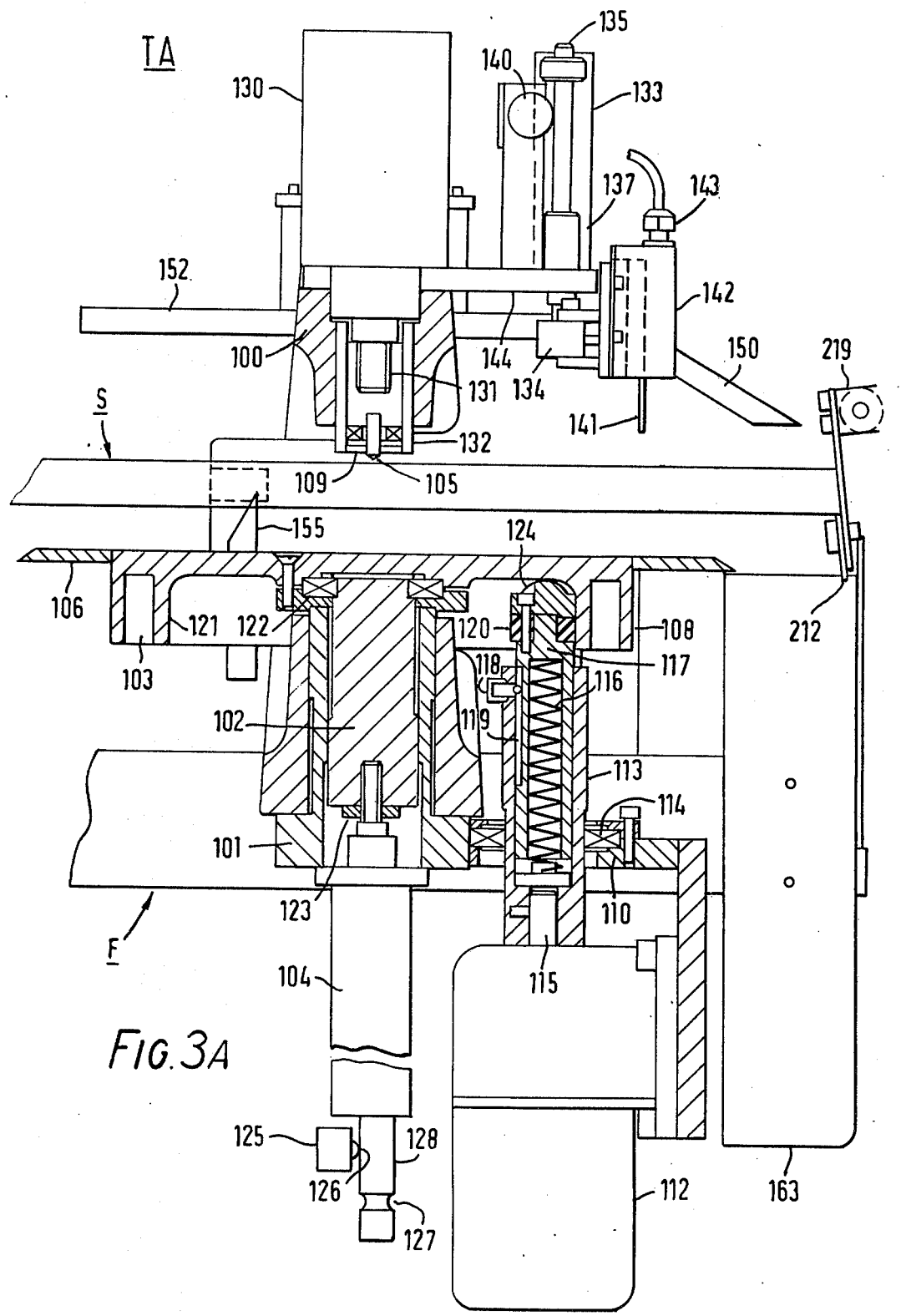
Figure 3B:
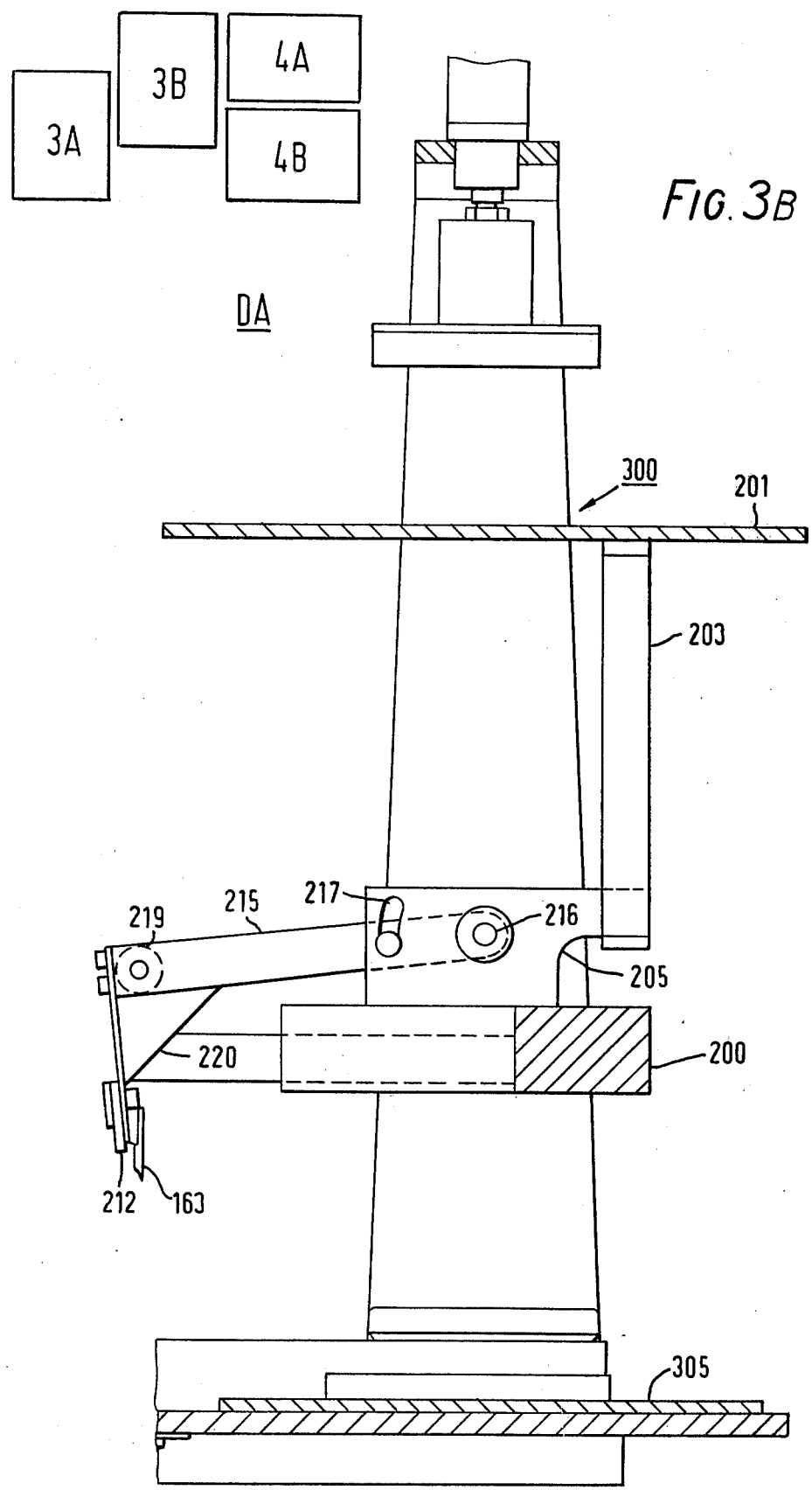

FIG. 3A is a left side elevation, partly in section, of a modification of the press of FIGS. 1a–c, FIG. 3B is a right side elevation, partly in section, of a modification of the press of FIGS. 1a–c, FIG. 4A is an upper end elevation, partly in section, of a modification of the press of FIGS. 1a–c, and FIG. 4B is a lower end elevation, partly in section, of a modification of the press of FIGS. 2a–c.

FIGS. 1 and 2 show a press for the automatic production of gramophone records, ie grooved disc records, particularly the 30 cm long playing type. Other forms of disc record eg video recordings formed by deformation of the disc surface may be produced by such a press. In outline the operation of the press is as follows. The various elements are mounted on a frame F. A quantity of a mixture of plastics materials and fillers is supplied from a hopper or pneumatic conveyor (not shown) to an extruder element E. The action of extruder E intimately mixes and heats the mixture to a yielding state and extrudes a measured quantity of the mixture into a cavity element C at a first work station and formed between the opposed mouths of record label magazine elements M1 and M2 which respectively contain the labels for the two sides of the completed record. The cavity C is formed in part by a sled S, the labels for the record to be formed from the shot and the magazines M1 and M2. The sled element S is displaceable from the position of cavity C along the line of the press to the pressing position element P and the trimming position element T. The sled carries the shot, with labels attached, firstly to the pressing position. The shot may be carried in a first transfer element T1 the part of the cavity formed by the sled or by members attached to the sled.

The shot is positioned at the pressing position P by the controlled movement of the sled. This movement of the sled also removes from the pressing position any previously pressed record and transfers it to the trimming position in a second transfer element T2. When the shot is in position the two stampers ST1 and ST2 come together, under hydraulic pressure, to mould the shot into the grooved record bearing the information formed on the stampers. The central hole of the record is also formed at this time.

The moulding of the record produces a certain amount of flash as some excess of material is essential to ensure that the mould formed between the stampers ST1 and ST2 is full of material. The flash is usually in the form of an outer ring of material attached to the record by a thin web extending to what will be the thickened edge of the finished record. As the stampers part to release the moulded record the flash is held by grooves or other means of transfer element T2 on the sled which is then approaching with the next shot and the moulded record is transferred, held by the flash, to the trimming station. The record is by now becoming more rigid as the material cools. At the trimming station, T, which as embodying the invention will be described below, the flash is removed and the record again transferred to the sled and held, preferably by vacuum means, T3, for movement to a box B in which moulded, trimmed records are received and stacked with aluminium disc stiffeners automatically interleaved every five records or so by the action of a disc dispenser element. The records may then be bagged and sleeved as required for despatch.

As mentioned above the record is becoming stiffer as it travels from the press position but being made of a thermoplastic mixture without a specific freezing point it is still deformable if roughly treated. Furthermore the flash when removed from the record must be cleared away as soon as possible to prevent it jamming the action of, say the sled, by becoming trapped in the press mechanism.

A trimming station for an automatic record press and which embodies the invention will now be specifically described. Clearly the trimming station may also be an independent entity or part of any other form of automatic record press.

The action of the trimming station is to hold the record on a turntable support as large as the finished record, engage a hot knife blade with a thin web joining the flash to the record, rotate the turntable to cut through the whole web so that the flash falls around the turntable onto a platform, and withdraw the turntable flush to the platform, before the withdrawal of the turntable the sled has returned and picked-up the record with suckers to hold it above the flash for movement to the output box while the flash is swept from the flush platform to a chute.

An apparatus to produce this operation is shown in FIGS. 3 and 4 and is now described in detail.

FIGS. 3 and 4 show the elements which replace the elements T, D of FIGS. 1 and 2 and are mounted on the frame F in their place.

Element TA, which replaces element T of FIGS. 1 and 2, is mounted on a support 100 which is attached to the side members FL and FR of the frame F.

A bush 101 is screwed into support 100 to in its turn house a spindle 102 of a turntable 103. Bush 101 is shaped to guide spindle 102 while the turntable 103 is raised, by the action of an hydraulic or other thrust means 104, towards contact with a pressure pad including a collar 109, which may carry a pilot pin 105, and rotated when so raised.

Turntable 103 is surrounded by a platform 106. The turntable fits closely to a hole 107 in the platform and the turntable has a skirt 108 to maintain this close fit even when the turntable is raised. The fit is clearly not so close as to restrict the raising or rotating of the turntable but is close enough to prevent flash entering and jamming the turntable.

Bush 101 supports, via a collar 110 positioned by screws such as 111, a turntable drive assembly.

This assembly includes an electric motor 112 bolted to the collar and drive sleeve 113 extending through a bearing 114 in the collar from a spindle 115 of the motor. The drive sleeve 113 houses a spring 116 and a telescopic drive member 117. The member 117 is retained by the interaction of a peg 118, mounted in sleeve 113, with a slot 119 in the member, which slot permits only a certain extension of the member. The outer end of member 117 is of reduced diameter and supports a rubber drive ring 120 and a plastics thrust pad 124. Pade 124 is preferably of the proprietary plastics material Nylon (Registered Trade Mark). Pad 124 provides a low-friction contact so that the rubber drive ring 120, when rotated by the action of motor 112 can rotate the turntable 103 by contact with the inner face 121. The telescopic drive member urged by spring 116, ensures that this drive is maintained even when the turntable is raised. Bearing 122 permits the free rotation of the turntable on spindle 102. The nut 123 is adjustable to set the rest height of the turntable level with platform 106.

The raising of the turntable is supervised by a microswitch 125. This switch is operated by an extension 128 of the piston of thrust means 104. Extension 128 is provided with a peripheral groove 127 which is positioned so that when the turntable 103 is raised against the action of thrust means 130 to retain a single record on pin 105 the actuating ball 126 of switch 125 enters groove 127 and causes switch 125 to change position. If either no record or two more records are retained on pin 105 the ball 126 is held depressed by the surface of extension 128, preventing the operation of switch 125 and indicating a fault condition to a machine operator.

Support 100 also houses a further thrust means 130 which is coaxial with thrust means 104 but opposed to it. Thrust means 130, which may be of pneumatic type, has an output member 131 which can urge the pilot pin 105 to extend from housing 132 in which the pin is rotatably mounted. The pin 105 has a collar 109 to ensure that the pin can only just enter the hole in a record centre.

The relative forces exertable by thrust means 104 and 130 are selected so that when a record is engaged by pilot pin 105 and then held against collar 109 by the raised turntable 103 the vertical position of the record is set by the means 130. However when pin 105 is retracted by the reversed action of thrust means 130 the thrust means 104 can extend further under its maintained energisation to bring the upper surface of the record into contact with vacuum holding means 210 on bridge member 200 forming part of sled S. The holding means are energised over vacuum connection 211.

Although the thrust means 130 is shown and described with a collar 109 and pin 105 forming a pressure pad pin 105 is not essential. If it is found that the pin does not coincide exactly with the record hole, causing distortion, the pin may be omitted and any slight resultant eccentricity of flash, which does not affect the reproduction of the recorded sound, tolerated.

The holding of the record between clamps acting on the label area rather than the grooved area or by pushing a pin through the hole, which methods have been proposed, reduces damage to the fragile grooved area. When records of the type which have an edge thicker than the grooved area are to be trimmed the turntable is dimensioned so that the thicker record edge rests on the rim of the turntable, further protecting the grooved area.

Support 100 also carries a hot-knife sub-assembly including a knife displacing means 133, which may also be an hydraulic cylinder, operating on output member (not shown) which supports a knife blade carrier 134. The carrier 134 is guided by two guide bars 135 and 136 running in sleeves 137 and 138 respectively. Guide bar 136 carries a cam 139 to operate a microswitch 140 as long as the carrier is displaced from the rest position the action of means 133. Blade 141 is clamped on a blade heater block 142 which is heated by electrical energy supplied over a connection via union 143. The blade 141 is provided with a "raked" leading edge so that as the turntable revolves the slope of the raked edge tends to keep the record pressed down on the turntable. The hot knife sub-assembly is mounted on a plate 144 attached to support 100.

Two ramps are also attached to support 100. Each ramp has two parts a slope 150 and 151 and a level part 152 and 153. The purpose of these is described below. Two scraper blades 154 and 155 are supported in slots in platform 106. The blades are pivotted below platform 106 by brackets 156 and 157 provided with stops 158 and 159. This arrangement permits the scraper blades to be pushed down to the platform level in their slots 160, 161 as the sled S moves towards the output end of the press (the right hand side of FIG. 3) but due to their unbalanced pivot point they rise out of the slots when the sled S reverses and engage their stops to prevent flash etc., being drawn into the press from the trimming area.

Flash from the trimming area is directed as described below into a flash chute 163.

FIGS. 3 and 4 also show the components of the sled element S which are added for this embodiment of the invention. As mentioned above a bridge member 200 forms part of sled S. This bridge member supports a platform 201 which forms a magazine for the aluminium disc stiffeners referred to earlier. The platform is mounted on columns 202 and 203 which are connected to the bridge member 200 by blocks 204 and 205. Blocks 204 and 205 also support a flash removal paddle sub-assembly.

The paddle sub-assembly includes a pair of paddles, one of which is shown at 212 in section and the other at 213 in plan mounted at the end of arms 214 and 215. Arms 214 and 215 are respectively pivotted on blocks 204 and 205 as shown at 216. The pivotal movement of the arms is limited by a pin and slot arrangement as at 217. The paddle-bearing end of each arm has a roller 218, 219. These rollers are positioned to engage the respective ones of the sloping part 150 and 151 of the runnders when the sled is on its return stroke, i.e., moving towards the extruder end of the press. The motion of the sled pushes the rollers up the slopes 150 and 151 and along the level parts. 152 and 153. This raises the paddles above the level of any record on turntable 103, to avoid damage to it, and the gap between the paddles allows the housing 132 to pass between them.

The stroke of the sled is enough to take the rollers off the ends of the level part 152 and 153 so that the paddles drop onto the platform 106 on the side adjacent the press element P. On the forward stroke of sled S flash on the platform 106 will be collected by the paddles and swept into chute 163.

The level to which the turntable 103 is retracted is chosen to be slightly below the platform 106 to avoid the turntable lifting the paddles over flash while not trapping flash above the turntable in the recess thus formed in the platform.

The paddles are preferably of a plastics material, as Nylon (Registered Trade Mark), and are attached to the arms by brackets such as 220.

Element DA, which replaces element D, is mounted on one end of frame F and forms an arch 300 across the bed of the press. The arch supports at the top a disc dispensing sub-assembly 301. This sub-assembly includes a suction means 302 to pick up an aluminium disc from magazine platform 201. The suction means 302 is mounted on a thrust means 303, which may be hydraulic, operable to extend the suction means 302 into contact with the top disc on platform 301, then raise the disc clear to allow the platform to move away with the sled S on its return stroke and then lower the disc onto a stack of records in box B which is placed under the arch 300 on the press bed at 305. The suction means 302 is energised over a flexible or extensible conduit 304.

The various parts of the embodiment of the invention having been described in detail the operational sequence will now be set forth. It is assumed that no records are present in the apparatus shown in FIGS. 3 and 4 but that a box B is in place and a stack of aluminium discs is on the platform 201. The sled is at the end of a forward stroke so the position is as shown in FIG. 3. The sled now executes a return stroke.

This brings the paddles to the press position side of platform 106 and releases a record with flash to the sled at the press position. This record is carried by the sled at its next forward stroke to a position with the centre hole of the record below pilot pin 105. The paddles move to sweep any flash into the chute 163. The arrival of the sled is sensed by a micro switch, not shown, and the turntable 103 is raised by thrust means 104 to engage the record on pilot pin 105. The telescopic drive member 117 extends under the action of spring 116. The level to which the record is raised is set by the extent to which the pilot pin is lowered by thrust means 130 which also operates in response to the microswitch. The record having been secured between the turntable 103 and the collar 109 during a pause in the movement of the sled, the sled is caused to execute its return stroke. The timing of the motion of the sled is set by a central timer of the press, which timer may be of the type having a group of cams operating electrical switches. When the sled has completed its return stroke four events are caused to occur viz the label magazines close onto the cavity C and the ram R rises, the stampers in the press close on the shot and labels, the heated knife 141 is caused to descend and the turntable 103 starts to revolve.

The knife penetrates the web attaching the flash to the record and as the turntable revolves, cuts free the closed ring of flash which falls on to platform 106 around turntable 103. The action of the heated knife produces a smooth edge to the record which is of better quality than achieved by previous trimming methods. As the ring of flash does not have to be cut through there is less stress on the record which reduces the risk of distortion.

After at least one revolution of the turntable the knife is retracted and the turntable stopped. Preferably and conveniently these actions are initiated by the end of the operating cycle of extruder E. The operation of the extruder is supervised by a relay circuit including a latching relay. The latching relay is latched each time the extruder is operated to provide the material for a shot. So long as the relay is latched the ram R can be operated to force the extruded material for the shot into the cavity C and then withdrawn for the next shot. The raising of the ram, as mentioned above, coincides with the beginning of the trimming operation. The signal for the lowering of the ram R is also used to switch off the turntable drive motor 112 and to cause the thrust means 130 to retract pin 105 and collar 109, allowing the turntable to rise, and thrust means 133 to retract the knife 141.

The thrust means 130 retracts the pivot pin 105 leaving the record on the turntable which itself rises by the continued action of thrust means 104. This rise brings the record up to the suckers 210, on bridge 200, which grip the record and hold it while the turntable descends.

The interval over which the ram is lowered, c 2½ secs, is allowed for the record on the turntable to become held on suckers 210. The arrival of the ram at its lowest point is sensed and this signal from this sensing also causes the retraction of the turntable 103. The proper retraction of knife 141 operates microswitch 140 to allow the continuation of the cycle of operations. Clearly the knife must be raised fully before the sled is allowed to move.

The timer now causes the sled to make a forward stroke which carries the record under arch 300 and over box B. The suckers 210 release their grip and the record is lowered into box B. The paddles 212, 213 move with the sled to sweep the flash across platform 106 and the now-retracted turntable 103 into chute 163.

The sled will have also brought a freshly pressed record to the trimming position.

If it is desired to place an aluminium disc in box B it is picked up at this time by suction means 302 and held until the return stroke of sled S when the disc is lowered into the box B. The placing of a disc may be controlled by the press timer or a counter responsive to the number of records in the box.

In the arrangement described above the record with flash is held by being clamped to the turntable for rotation past the knife. Clearly the record with flash could be held in other ways to separate the flash. Thus the flash could be held and the trimming means moved around or downwardly relative to the record then separate the flash.

The apparatus and operation described above provide a record trimming process which produces a smoothly trimmed record with minimum risk of distortion and handling of the record. The flash is readily removed and the trimming station will not easily be jammed by the flash. The use of the heated knife engaged only with the web without cutting through the thicker flash also reduces distortion of the record by reducing the cutting effort applied to it. Clearly the heated knife will cut through flash of other forms than that attached by a thin web and can also cope with irregular flash shapes. The clamping of the record at the centre only to revolve with the turntable reduces the risk of damage to the grooved area which need not be touched at any stage.

As mentioned earlier the invention is relevant to disc records whether of sound or video or other information.

I claim:

1. Apparatus for the manufacture of a disc record including a source of material mouldable for processing to a disc record operable to supply said material to a first work station at which to form a shot of said material, a second work station at which to press from said shot a disc with surplus material attached as flash, a third work station at which to trim said flash material from said disc, a receiver for trimmed disc records and a reciprocal transfer assembly having first second and third transfer elements simultaneously operable forwardly to pick-up material in process from a respective work station and transfer it to a set-down position and return empty to the pick-up work station, the transfer assembly also having a flash clearing element simultaneously operable with said transfer elements to sweep trimmed flash from the third work station to a discharge point.

2. Apparatus according to claim 1 including means to transfer the disc with flash attached and release it to a support no larger than the disc when trimmed, means to hold the disc with flash on said support, means to provide relative motion of the disc with flash and a trimming member thereby to cut the flash at the edge of the supported disc to separate a ring of flash from the disc, and means to transfer the trimmed disc off the support and away from the trimmed flash to a receiving point.

3. Apparatus as claimed in claim 2 including a turntable support and a freely rotatable collar sized to fit on a disc centre, the turntable and collar being housed in the apparatus to be urgable toward one another to clamp the transferred disc with flash attached at the centre to release it from the transfer means and hold it on the support, means to rotate the turntable and clamped disc to permit the separation of the flash by the trimming means, the separated flash ring falling around the turntable and means to hold up the trimmed disc on withdrawing the turntable to release the flash ring from around it.

4. Apparatus according to claim 3 including a fluid-pressure operated thrust member operable to urge the collar toward the turntable and then withdraw to permit a further fluid-pressure operated thrust member to urge the turntable to lift the disc to engage with a suction holder on the transfer means.

5. Apparatus according to claim 2 including means to sweep trimmed flash from beneath the trimmed disc.

6. Apparatus according to claim 2 in which said flash clearing element is supported for movement in one direction at a first level to sweep said trimmed flash to a discharge point and in the other direction at a second level to avoid the clamped disc and attached flash.

7. Apparatus according to claim 2 including a heated knife trimming member and means selectively operable to cause the knife to pierce a web of the flash at the supported edge of the disc.

8. Apparatus according to claim 1 for the automatic manufacture of disc records in which said transfer means is a transfer sled assembly of an automatice disc record press and the third transfer element is a suction element against which a trimmed disc is urged for transfer to said receiver.

9. Apparatus according to claim 1 in which the flash clearing element is movable forwardly at a first level in the apparatus to clear trimmed flash and in return at a second level to avoid contact with a disc and attached flash transferred by the second transfer element to the third, trimming, work station.

10. Apparatus for the automatic manufacture of a disc record according to claim 1 including at the third, trimming, station a reciprocable turntable as large as the trimmed disc record, means to release a record transferred with flash attached thereto by a thin web from the transfer assembly at one extreme of movement and hold the record on the projected turntable on the reciprocation of the transfer assembly means to engage, a heatable knife blade with the flash at the periphery of the turntable to pierce said thin web and revolve the turntable and record to cut the web around the record with the hot knife severing a ring of flash to fall around the projected turntable, means on the transfer assembly effective at said one extreme to pick up the trimmed record from the projected turntable and transfer the record to said receiver, the projected turntable retracting before the movement of the transfer assembly and picked up record to permit the flash clearing element to sweep away the ring of flash now disengaged by the retraction of the turntable.

* * * * *